United States Patent
Fruh et al.

(10) Patent No.: US 11,747,795 B2
(45) Date of Patent: *Sep. 5, 2023

(54) SYSTEMS AND METHODS FOR ENABLING AND DISABLING OPERATION OF MANUFACTURING MACHINES

(71) Applicant: DISH Technologies L.L.C., Englewood, CO (US)

(72) Inventors: Jason Fruh, Castle Rock, CO (US); George M. Hansen, Lakewood, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/192,504

(22) Filed: Mar. 4, 2021

(65) Prior Publication Data

US 2021/0191373 A1 Jun. 24, 2021

Related U.S. Application Data

(63) Continuation of application No. 16/692,872, filed on Nov. 22, 2019, now Pat. No. 10,969,772, which is a (Continued)

(51) Int. Cl.
*G05B 19/41* (2006.01)
*G05B 19/418* (2006.01)

(52) U.S. Cl.
CPC ........ *G05B 19/41875* (2013.01); *Y02P 90/02* (2015.11)

(58) Field of Classification Search
CPC .......................... G05B 19/41875; Y02P 90/02
(Continued)

(56) References Cited

U.S. PATENT DOCUMENTS 6,314,385 B1 * 11/2001 Kim ................. G05B 19/41875
702/182
6,555,984 B1 4/2003 Rajala et al.
(Continued)

FOREIGN PATENT DOCUMENTS

CN 1311917 A 9/2001
CN 1452733 A 10/2003
(Continued)

OTHER PUBLICATIONS

International Search Report and Written Opinion for corresponding International Application No. PCT/US2013/021569, dated Apr. 26, 2013, 10 pages.

*Primary Examiner* — Robert E Fennema
*Assistant Examiner* — Christopher W Carter
(74) *Attorney, Agent, or Firm* — VLP Law Group LLP

(57) ABSTRACT

A system for enabling and disabling operation of manufacturing machines provides a manufacturing machine user interface that facilitates receiving quality control information regarding the manufacturing machine from a user. For quality assurance purposes, the computer system of the manufacturing machine may decide whether to enable operation of the manufacturing machine based on the received quality control information. The computer system of the manufacturing machine may also decide to disable operation of the manufacturing machine if the quality control information provided is incomplete, out of date, or otherwise insufficient to indicate the manufacturing machine is ready for safe and effective operation. In some embodiments, one or more client systems, telecommunications devices, and/or personal digital assistant (PDA) devices on which the user interface is displayed and with which the manufacturing machine is in communication may enable (Continued)

operation of the manufacturing machine based on the received quality control information.

18 Claims, 7 Drawing Sheets

Related U.S. Application Data continuation of application No. 13/351,875, filed on Jan. 17, 2012, now Pat. No. 10,520,931.

(58) Field of Classification Search
USPC .......................................................... 700/109
See application file for complete search history.

(56) References Cited

U.S. PATENT DOCUMENTS

| | | |
|---|---|---|
| 6,618,692 B2 | 9/2003 | Takahashi et al. |
| 6,757,521 B1 | 6/2004 | Ying |
| 6,766,208 B2 | 7/2004 | Hsieh |
| 7,054,698 B2 | 5/2006 | Wegleitner et al. |
| 7,974,741 B2 | 7/2011 | Watson |
| 10,520,931 B2 | 12/2019 | Fruh et al. |
| 2002/0138232 A1 | 9/2002 | Wagner |
| 2002/0161502 A1 | 10/2002 | McCaherty |
| 2005/0022831 A1 | 2/2005 | Hirsch et al. |
| 2005/0107898 A1 | 5/2005 | Gannon et al. |
| 2005/0115428 A1 | 6/2005 | Draghetti et al. |
| 2006/0087402 A1 | 4/2006 | Manning et al. |
| 2008/0147226 A1 | 6/2008 | Matsushita et al. |
| 2009/0169091 A1 | 7/2009 | Coopman |
| 2010/0228377 A1 | 9/2010 | Milisav |
| 2013/0184548 A1 | 7/2013 | Matsumura |

FOREIGN PATENT DOCUMENTS

| | | |
|---|---|---|
| CN | 101639685 A | 2/2010 |
| KR | 10-2009-0001710 A | 1/2009 |

* cited by examiner

SYSTEMS AND METHODS FOR ENABLING AND DISABLING OPERATION OF MANUFACTURING MACHINES

TECHNICAL FIELD

This disclosure generally relates to manufacturing machines, and particularly to quality control of manufacturing machines.

BRIEF SUMMARY

In one embodiment, a manufacturing machine user interface facilitates receiving quality control information regarding the manufacturing machine from a user. For quality assurance purposes, the computer system of the manufacturing machine may decide whether to enable operation of the manufacturing machine based on the received quality control information. The computer system of the manufacturing machine may also decide to disable operation of the manufacturing machine if the quality control information provided is incomplete, out of date, or otherwise insufficient to indicate the manufacturing machine is ready for safe and effective operation. In some embodiments, one or more client systems, telecommunications devices, and/or personal digital assistant (PDA) devices on which the user interface is displayed and with which the manufacturing machine is in communication may enable operation of the manufacturing machine based on the received quality control information.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

Figure 1:
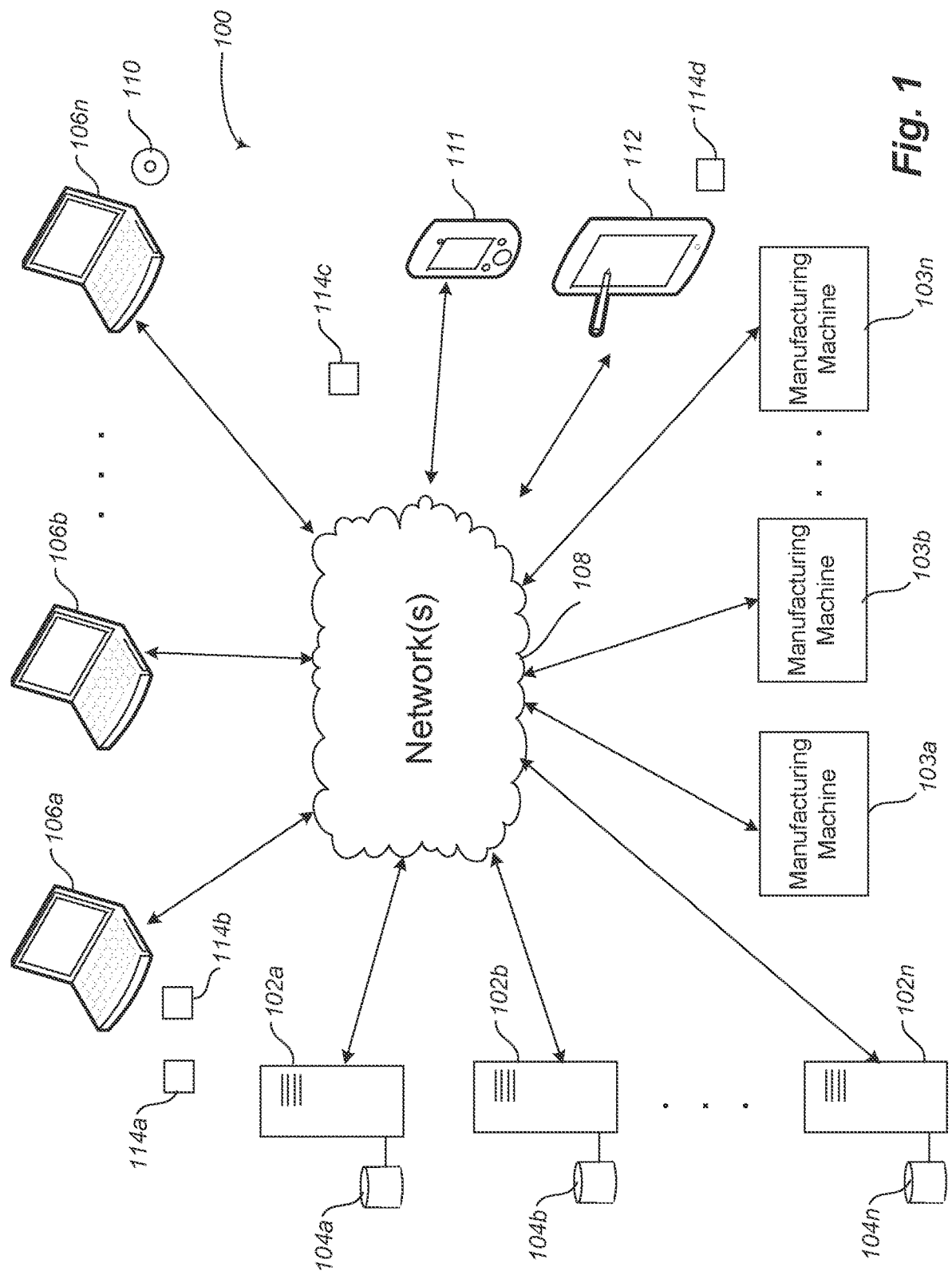
FIG. 1 is a schematic diagram of a networked environment, including a number of servers, clients and manufacturing machines communicatively coupled to each other by one or more networks, of which systems and methods for enabling and disabling operation of manufacturing machines may be a part, or in which they may be implemented, according to one illustrated embodiment.

FIG. 1 is an overview block diagram illustrating an example networked environment 100, including a number of servers, clients and manufacturing machines communicatively coupled to each other by one or more networks, of which systems and methods for enabling and disabling operation of manufacturing machines may be a part, or in which they may be implemented, according to one illustrated embodiment.

Before providing additional details regarding the operation and constitution of methods and systems for enabling and disabling operation of manufacturing machines, the example networked environment 100, within which a manufacturing machine may operate, will briefly be described.

The networked environment 100 includes a number of server computing systems 102a-102n (collectively 102). The server computing systems 102 include processors that execute server instructions (i.e., server software) stored on computer-readable storage media to provide server functions in the networked environment 100. For example, the server computing systems 102 may electronically receive, store, generate, analyze, track and transmit quality control information regarding one or more of the manufacturing machines 103a-103n on the network 108. This quality control information regarding one or more of the manufacturing machines may be stored in one or more databases or other computer-readable storage media 104a-104n (collectively 104). The quality control information regarding one or more of the manufacturing machines 103a-103n includes, but is not limited to, information regarding one or more of: maintenance records, inspection records, certifications, standards, quality assurance, manufacturing machine training, quality goals, manufacturing machine documentation, manufacturing machine conformance, manufacturing machine compliance, manufacturing machine history information, manufacturing machine standards, quality standards, manufacturing machine warranties, operator qualifications and certifications, manufacturing machine monitoring, health and safety requirements, manufacturing policies, manufacturing machine operational readiness, manufacturing machine performance records, operator credentials, etc.

The networked environment 100 includes a number of client computing systems 106a-106n (collectively 106) selectively communicatively coupled to one or more of the server computing systems 102 and/or manufacturing machines 103a-103n via one or more communications networks 108. The client computing systems 106 include one or more processors that execute one or more sets of communications instructions stored on any of a variety of non-transitory computer-readable storage media 110 (only one illustrated in FIG. 1). The client computing systems 106 may take a variety of forms, for instance desktop, laptop or notebook personal computers, tablet computers, workstations, mini-computers, mainframe computers, or other computational devices with microprocessors or microcontrollers which are capable of networked communications. The client computing systems 106 may be communicatively coupled to the rest of the network 108 via wired, wireless or a combination of wired and wireless communications channels.

The manufacturing machines 103a-103n may include machines configured to manufacture any physical product or parts of products and/or perform any physical process. For example, one or more of the manufacturing machines 103a-103n may be located on a factory floor of a manufacturer or processing plant of one or more of said products or parts of products. Also, one or more of the manufacturing machines 103a-103n may be located at different manufacturing or processing facilities. The one or more of the manufacturing machines 103a-103n may also be different manufacturing machines configured to make different products and perform different processes.

The networked environment 100 includes a number of telecommunications devices 111 (only one illustrated). Such telecommunications devices 111 may, for example, take the form of Internet or Web enabled cellular phones or smart phones (e.g., iPHONE®). The networked environment 100 also includes a number of personal digital assistant (PDA) devices 112 (only one illustrated). Such PDA devices 112 may, for example, take the form of Internet or Web enabled PDAs or tablet computers (e.g., iPHONE®, iPAD®, TREO®, BLACKBERRY®), which may, for example, execute a set of browser instructions or program or other networking program. The networked environment 100 may include any number of a large variety of other devices that are capable of some type of networked communications. The telecommunications devices 110, PDA devices 112, as well as any other devices, may be communicatively coupled to the rest of the network 108 via wired, wireless or a combination of wired and wireless communications channels.

The one or more communications networks 108 may take a variety of forms. For instance, the communications networks 108 may include wired, wireless, optical, or a combination of wired, wireless and/or optical communications links. The one or more communications networks 108 may include public networks, private networks, unsecured networks, secured networks or combinations thereof. The one or more communications networks 108 may employ any one or more communications protocols, for example TCP/IP protocol, UDP protocols, IEEE 802.11 protocol, as well as other telecommunications or computer networking protocols. The one or more communications networks 108 may include what are traditionally referred to as computing networks and/or what are traditionally referred to as telecommunications networks or combinations thereof. In at least one embodiment, the one or more communications networks 108 includes the Internet, and in particular, the Worldwide Web or (referred to herein as "the Web"). Consequently, in at least one embodiment, one or more of the server computing systems 102 execute server software to serve HTML source files or Web pages 114a-114d (collectively 114), and one or more client computing systems 106, telecommunications devices 110 and/or PDAs 112 execute browser software to request and display HTML source files or Web pages 114.

The networked environment 100 includes an interactive system for electronically for enabling and disabling operation of the manufacturing machines 103a-103n. The interactive system for electronically for enabling and disabling operation of the manufacturing machines 1-3a-103n may include one or more server computing systems 102, databases 104 and one or more client systems 106, telecommunications devices 111, and/or PDA devices 112.

The one or more server computing systems 102 execute instructions stored on non-transitory computer-readable storage media that cause the server computing systems 102 to electronically receive, store, generate, track, act on, analyze and transmit quality control information regarding one or more of the manufacturing machines 103a-103n with respect to and/or between one or more client systems 106, telecommunications devices 111, manufacturing machines 103a-103n, and/or PDA devices 112, and provide communications during or in connection with such services to and between one or more client systems 106, telecommunications devices 111, manufacturing machines 103a-103n, and/or PDA devices 112. One or more of the client systems 106, telecommunications devices 111, manufacturing machines 103a-103n, and/or PDA devices 112 may instead or also execute instructions stored on non-transitory computer-readable storage media that cause such devices to electronically receive, store, generate, track, act on, analyze and transmit quality control information regarding one or more of the manufacturing machines 103a-103n with respect to and/or between one or more other client systems 106, telecommunications devices 111, manufacturing machines 103a-103n and/or PDA devices 112, and provide communications during or in connection with such services to and between one or more client systems 106, telecommunications devices 111, manufacturing machines 103a-103n and/or PDA devices 112.

Although not required, the embodiments will be described in the general context of computer-executable instructions, such as program application engines, objects, or macros stored on computer- or processor-readable storage media and executed by a computer or processor. Those skilled in the relevant art will appreciate that the illustrated embodiments as well as other embodiments can be practiced with other affiliated system configurations and/or other computing system configurations, including hand-held devices, multiprocessor systems, microprocessor-based or programmable consumer electronics, personal computers ("PCs"), network PCs, mini-computers, mainframe computers, and the like. The embodiments can be practiced in distributed computing environments where tasks or acts are performed by remote processing devices, which are linked through a communications network. In a distributed computing environment, program engines may be located in both local and remote memory storage devices.

One or more of the manufacturing machines 103a-103n may include one or more processors, computers, memories and/or controllers, either integrated with the respective manufacturing machine or coupled to the respective manufacturing machine as one or more peripheral devices. The one or more processors, computers, memories and/or controllers are configured to execute instructions stored on non-transitory computer-readable storage media that cause the respective manufacturing machine to electronically receive, store, generate, track, act on, analyze and transmit quality control information regarding one or more of the manufacturing machines 103a-103n with respect to and/or between one or more client systems 106, telecommunications devices 111, manufacturing machines 103a-103n, and/or PDA devices 112; provide communications during or in connection with such services to and between one or more client systems 106, telecommunications devices 111, manufacturing machines 103a-103n, and/or PDA devices 112; and provide a user interface for facilitating performance of such functions.

Figure 2:
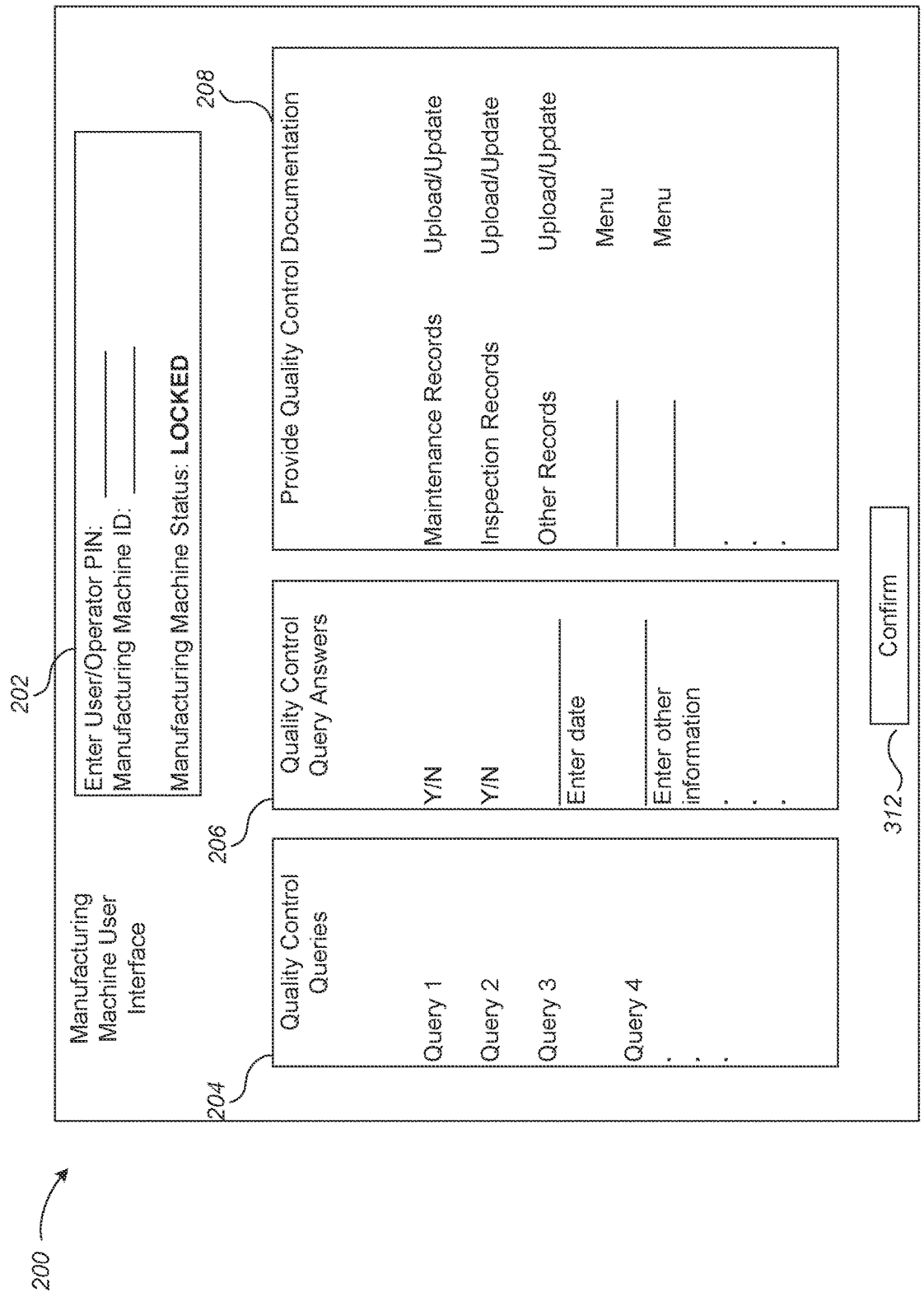
FIG. 2 is a diagram of an example manufacturing machine user interface, according to one illustrated embodiment.

FIG. 2 is a diagram of an example manufacturing machine user interface 200, according to one illustrated embodiment.

For example, the manufacturing machine user interface 200 may be a user interface of one or more of the manufacturing machines 103a-103n (e.g., manufacturing machine 103a). The manufacturing machine user interface 200 may be generated and/or presented by the manufacturing machine 103a on a local display of the manufacturing machine 103a and/or may be generated and/or presented on a display of one or more of the client systems 106, telecommunications devices 111, and/or PDA devices 112.

The manufacturing machine user interface 200 provides an interface that facilitates receiving of quality control information regarding the manufacturing machine 103a from a user. For quality assurance purposes, the computer system of the manufacturing machine 103a may decide whether to enable operation of the manufacturing machine based on the received quality control information. In some embodiments, one or more of the more client systems 106, telecommunications devices 111, and/or PDA devices 112 on which the user interface 200 is displayed and with which the manufacturing machine 103a is in communication may enable operation of the manufacturing machine based on the received quality control information.

The user interface 200 includes user interface elements such as an authentication dialog box 202, a Quality Control Queries dialog box 204, a Quality Control Query Answers dialog box 206, a Provide Quality Control Documentation 208 dialog box, and a "Confirm" button 312. Various other embodiments may include the same, fewer or more user interface elements displayed in different configurations for receiving input of quality control information from a user.

The authentication dialog box 202 is configured to receive input from a user such as a PIN, password, user name, biometric data or other user credentials to identify an authorized user of the manufacturing machine or quality control system. For example, particular users may be certified or otherwise identified as authorized to input required quality control information to enable operation of the manufacturing machine 103a. In some embodiments, any authorized operator of the manufacturing machine may be authenticated and authorized to input the required quality control information to enable operation of the manufacturing machine 103a. Also, in embodiments, where the manufacturing machine user interface 200 is configured to be displayed on one or more of the client systems 106, telecommunications devices 111, and/or PDA devices 112, a manufacturing machine ID may be required to be input to the authentication dialog box 202 to identify for which particular manufacturing machine the quality control information is being input, such as to enable operation of that particular manufacturing machine. The manufacturing authentication dialog box 202 also displays a manufacturing machine current status. The manufacturing authentication dialog box 202 shows an initial or default status of "locked" (indicating operation of the manufacturing machine 103a is being prevented) because the required quality control information has yet to be input and verified by the manufacturing machine 103a or one or more server systems 102, client systems 106, telecommunications devices 111, and/or PDA devices 112.

The quality control queries of the Quality Control Queries dialog box 204 may include one or more queries related to the quality control information required to enable operation of the manufacturing machine 103a. For example, the query may be regarding whether and/or when the most recent inspection had taken place, particular upgrades had been performed, required maintenance had been performed, etc. Other queries may instead or in addition be regarding quality control information including, but not limited to, information regarding one or more of: maintenance records, inspection records, certifications, standards, quality assurance, manufacturing machine training, quality goals, manufacturing machine documentation, manufacturing machine conformance, manufacturing machine compliance, manufacturing machine history information, manufacturing machine standards, quality standards, manufacturing machine warranties, operator qualifications, manufacturing machine monitoring, health and safety requirements, manufacturing policies, company manufacturing policies, manufacturing machine operational readiness, manufacturing machine performance records, operator credentials, etc. The Quality Control Query Answers dialog box 206 is configured to receive answers to such queries such as in the form a yes/no answer, dates an action or check had been performed, other information related to the query, etc.

The Provide Quality Control Documentation dialog box 208 is configured to facilitate input of entire records or portions of entire records containing quality control information, whether they are in electronic format, printed documents, or other standard or non-standard format. For example, if the user interface 200 is being displayed on one or more of the server systems 102, client systems 106, telecommunications devices 111, and/or PDA devices 112 with which the manufacturing machine 103a is in communication, then a user of such a device may have stored on that device particular records which may be uploaded directly to the manufacturing machine 103 a or to one or more server systems 102 using the Provide Quality Control Documentation dialog box 208.

Furthermore, if the user interface 200 is being presented on a display of the manufacturing machine 103a, the manufacturing machine 103a may have a scanner, document reader, smart card reader, near field communication (NFC) reader, radio frequency identification reader (RFID), etc., to read printed or electronic documents directly from a compatible external source. In some embodiments, one or more of the client systems 106, telecommunications devices 111, and/or PDA devices 112 may also include such a scanner, document reader, smart card reader, NFC reader, RFID reader, etc., to read printed or electronic documents directly from an external source. The Provide Quality Control Documentation dialog box 208 may have further submenus for the user to indicate, specify, and or select other quality control records to be input or to make an inquiry regarding which records are required to enable operation of the manufacturing machine 103a.

Once the required quality control information has been entered, uploaded, input or otherwise provided by the user via the manufacturing machine user interface 200, then the user may select a "confirm" button 312 or other selectable user interface element to indicate the user is ready for operation of the manufacturing machine 103a to be enabled.

The manufacturing machine 103a, or one or more of the server systems 102, client systems 106, telecommunications devices 111, and/or PDA devices 112 with which the manufacturing machine 103a is in communication, then verifies the provided quality control information that had been entered, uploaded, input or otherwise provided by the user. For example, such verification may include comparing the provided quality control information with stored quality standards related to the required quality control information, checking accuracy of the provided quality control information, verifying authenticity of the provided quality control information, verifying credentials of the user, etc., providing the provided quality control information for manual inspection, replying via the user interface with follow-up queries or requests for additional information, etc. For example, if a date entered by a user of the most recent particular upgrade to the manufacturing machine is older than a stored date set and a threshold standard, then the provided quality control information may be deemed insufficient to enable operation of the particular manufacturing machine 103a for which the quality control data was provided. The provided quality control data would therefore not be accepted to enable operation of the particular manufacturing machine 103a. On the other hand, if the date entered by a user of the most recent particular upgrade to the manufacturing machine is equal to or more recent than the stored date set as the threshold, then the provided quality control information may be deemed sufficient to enable operation of the particular manufacturing machine 103a for which the quality control data was provided. The provided quality control data would therefore be accepted to enable operation of the particular manufacturing machine 103a.

Figure 3:
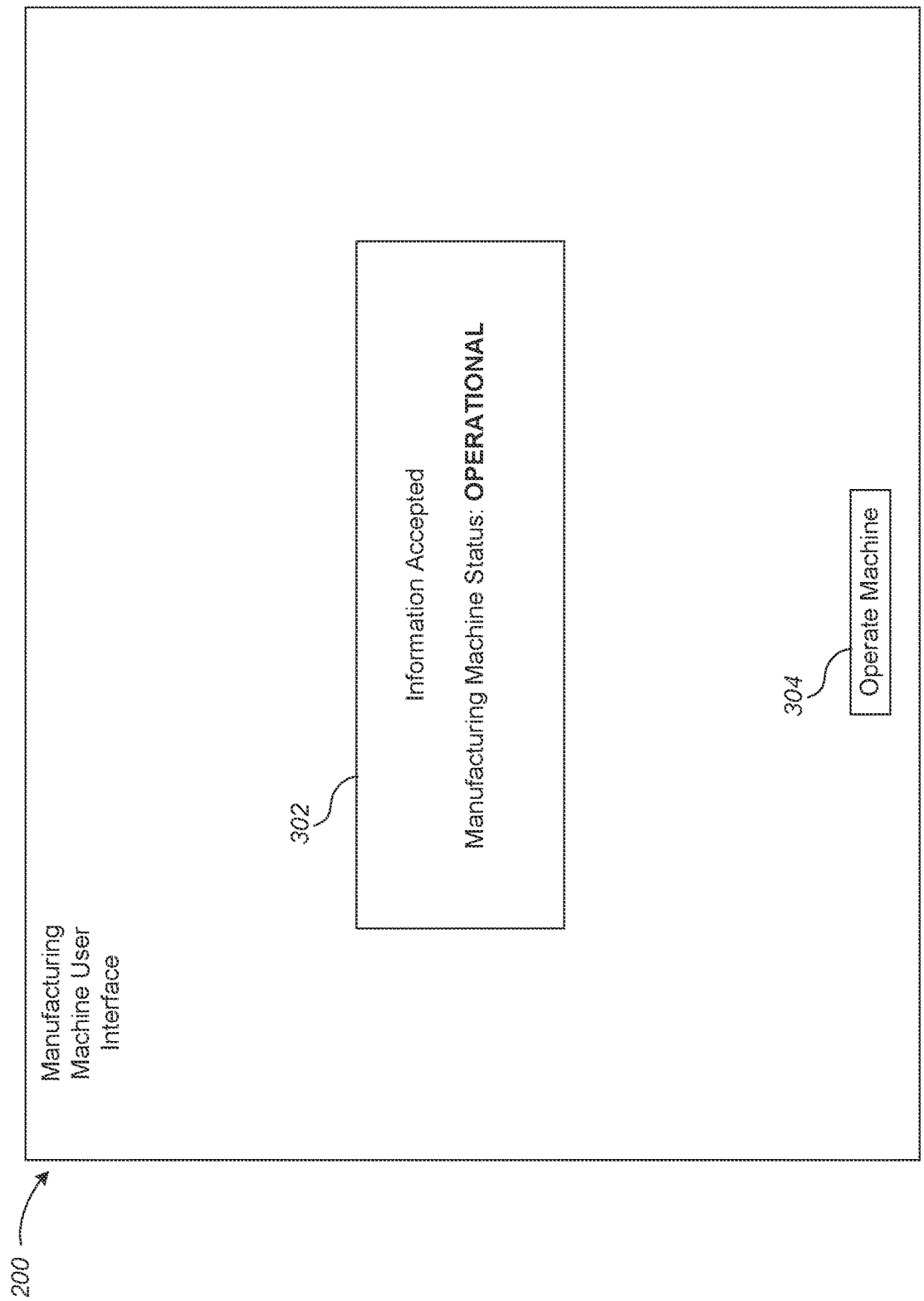
FIG. 3 is a diagram of the example manufacturing machine user interface of FIG. 2 after quality control information has been accepted, according to one illustrated embodiment.

FIG. 3 is a diagram of the example manufacturing machine user interface 200 of FIG. 2 after the quality control information has been accepted, according to one illustrated embodiment.

Shown is the example manufacturing machine user interface 200 including an "Information Accepted" dialog box 302 indicating that the quality control information previously entered is deemed sufficient to enable operation of the particular manufacturing machine 103a. Note that since the quality control information previously entered is deemed sufficient to enable operation of the particular manufacturing machine 103a, the current status of the manufacturing machine 103a is displayed on the user interface 200 as being operational. For example, a computer processor or controller of the manufacturing machine 103a may have generated and/or received a signal activating a switch or other electronic or mechanical device to enable operation of the mechanical elements of the manufacturing machine 103a. Also shown is an "operate machine" button 304 that when selected causes the manufacturing machine user interface to display the normal operation interface, if any, of the manufacturing machine 103a.

Figure 4:
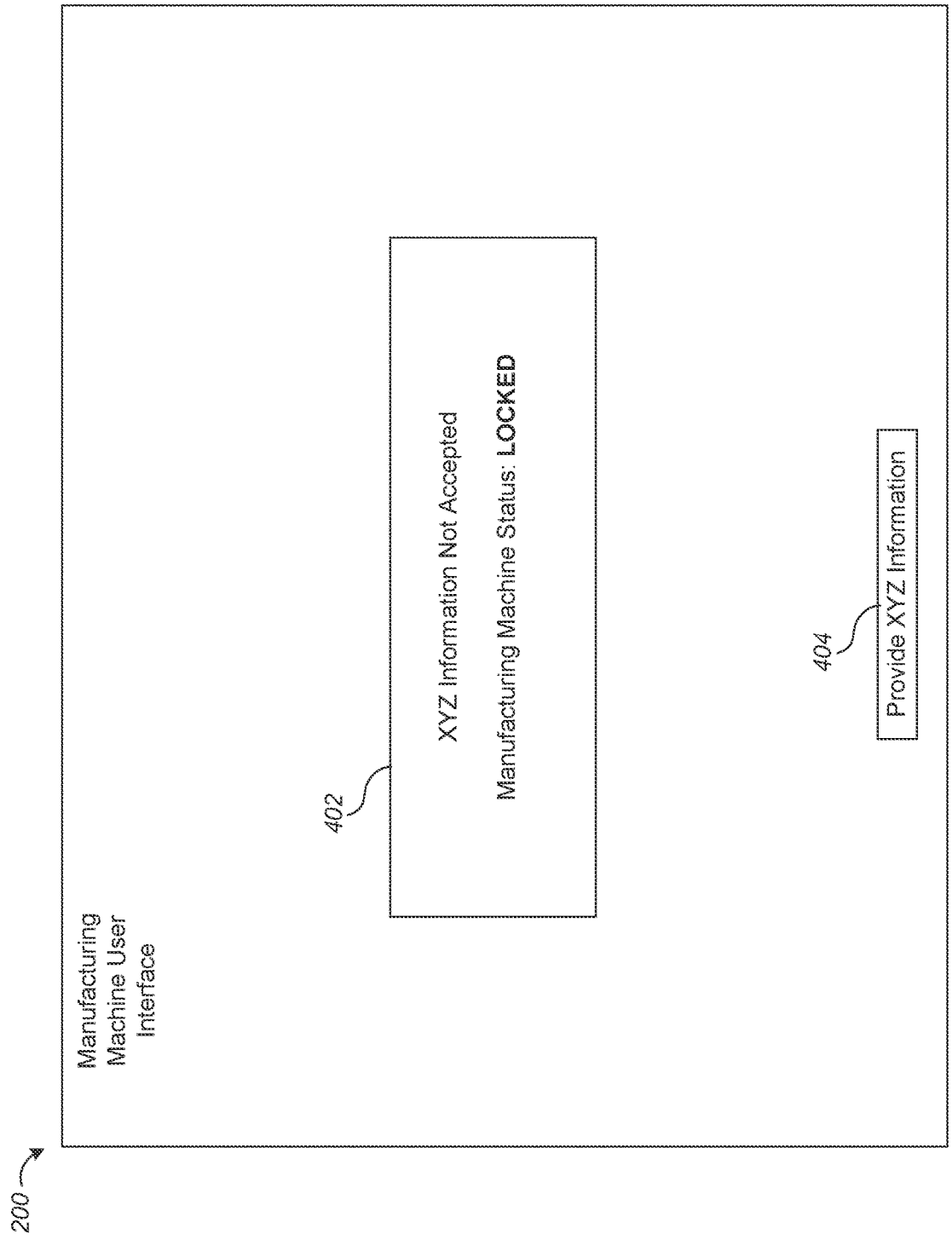
FIG. 4 is a diagram of the example manufacturing machine user interface of FIG. 2 after quality control information has not been accepted, according to one illustrated embodiment.

FIG. 4 is a diagram of the example manufacturing machine user interface 200 of FIG. 2 after the quality control information has not been accepted, according to one illustrated embodiment.

Shown is the example manufacturing machine user interface 200 including an "Information Not Accepted" dialog box 402 indicating that the quality control information previously provided is deemed insufficient to enable operation of the particular manufacturing machine 103a. The "Information Not Accepted" dialog box 402 may also indicate specific parts, categories, or types of the provided quality control information that was deemed insufficient, or that was missing (e.g., "XYZ" information). Note that since the quality control information previously entered is deemed insufficient to enable operation of the particular manufacturing machine 103a, the current status of the manufacturing machine 103a is displayed on the user interface 200 as being locked. For example, a computer processor or controller of the manufacturing machine 103a may have generated and/or received a signal activating a switch or other electronic or mechanical device to disable operation of the mechanical elements of the manufacturing machine 103a. This may occur in instances where quality control information is required during operation of the manufacturing machine 103a. In other embodiments, if the manufacturing machine 103a was already in a locked state, the manufacturing machine 103a may have done nothing to change the current state from locked to operational if the provided quality control information was not accepted.

Also shown is a "Provide XYZ Information" button 404 that, when selected, causes the manufacturing machine user interface 200 to display an interface that allows the user to input the required quality control information such as the user interface shown in FIG. 2 or another user interface customized to provide the required incorrect or missing "XYZ" information. Also, additional information regarding why the provided quality control information was not accepted may also be displayed on the user interface 200.

Figure 5:
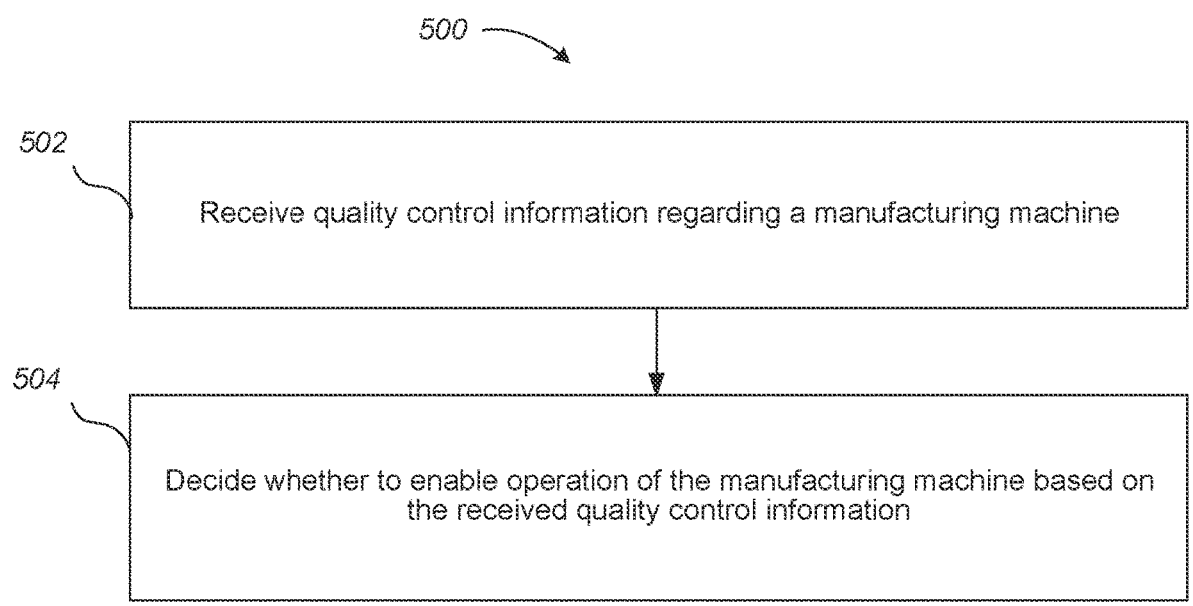
FIG. 5 is a flow diagram of a method of deciding whether to enable operation of a manufacturing machine, according to one illustrated embodiment.

FIG. 5 is a flow diagram of a method 500 of deciding whether to enable operation of a manufacturing machine, according to one illustrated embodiment.

At 502, the manufacturing machine 103a, or one of the server systems 102, client systems 106, telecommunications devices 111, or PDA devices 112, receives quality control information regarding the manufacturing machine 103a.

At 504, the manufacturing machine 103a, or one of the server systems 102, client systems 106, telecommunications devices 111, or PDA devices 112, decides whether to enable operation of the manufacturing machine based on the received quality control information.

Figure 6:
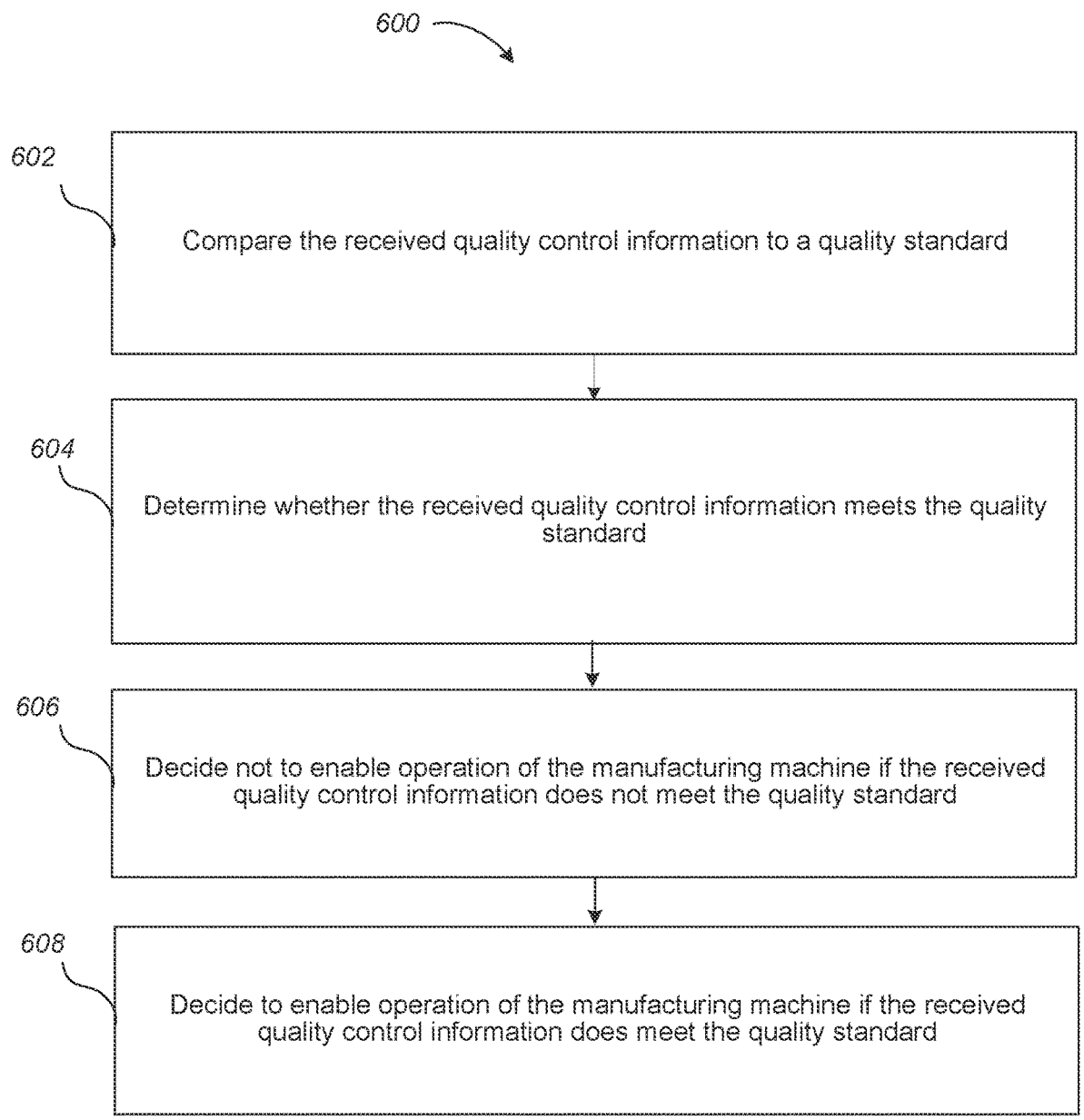
FIG. 6 is a flow diagram showing a portion of the method of FIG. 5 in more detail, according to one illustrated embodiment.

FIG. 6 is a flow diagram of a method 600 showing a portion of the method 500 of FIG. 5 in more detail, according to one illustrated embodiment. In particular, step 502 of deciding whether to enable operation of the manufacturing machine based on the received quality control information is shown in more detail in the method 600 of FIG. 6.

At 602, the manufacturing machine 103a, or one of the server systems 102, client systems 106, telecommunications devices 111, or PDA devices 112, compares the received quality control information to a quality standard.

At 604, the manufacturing machine 103a, or one of the server systems 102, client systems 106, telecommunications devices 111, or PDA devices 112, determines whether the received quality control information meets the quality standard.

At 606, the manufacturing machine 103a, or one of the server systems 102, client systems 106, telecommunications devices 111, or PDA devices 112, decides not to enable operation of the manufacturing machine 103a if the received quality control information does not meet the quality standard.

At 608, the manufacturing machine 103a, or one of the server systems 102, client systems 106, telecommunications devices 111, or PDA devices 112, decides to enable operation of the manufacturing machine 103a if the received quality control information does meet the quality standard.

Figure 7:
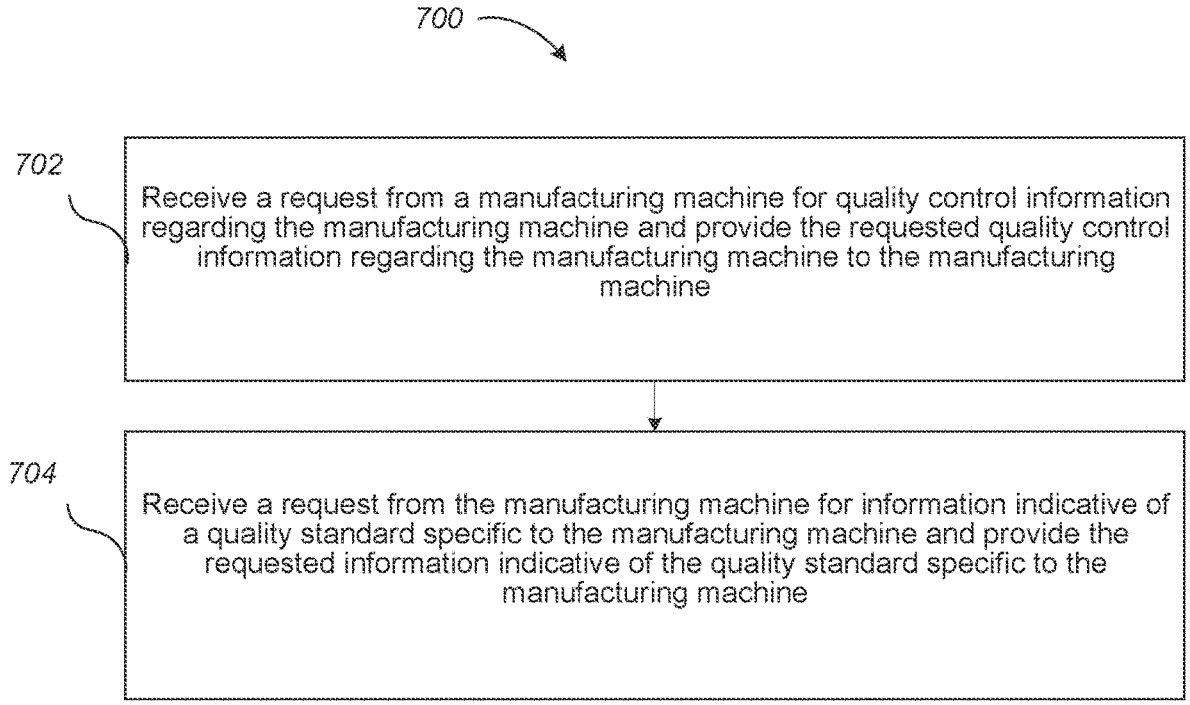
FIG. 7 is a flow diagram of a method of providing quality control information regarding a manufacturing machine, according to one illustrated embodiment.

FIG. 7 is a flow diagram of a method of providing quality control information regarding a manufacturing machine, according to one illustrated embodiment.

At 702, one of the server systems 102, client systems 106, telecommunications devices 111, or PDA devices 112 receives a request from a manufacturing machine for quality control information regarding the manufacturing machine and provides the requested quality control information regarding the manufacturing machine to the manufacturing machine. For example, manufacturing machine may request such information to in order to enable operation of the manufacturing machine at the request of a user.

At 704, one of the server systems 102, client systems 106, telecommunications devices 111, or PDA devices 112 receives a request from the manufacturing machine for information indicative of a quality standard specific to the manufacturing machine and provides the requested information indicative of the quality standard specific to the manufacturing machine. For example, manufacturing machine may request such information to in order to verify, check, certify or validate the received quality control information to enable operation of the manufacturing machine. Also, manufacturing machine may request compliance information regarding the manufacturing machine produced by the server system if the server system had already performed the verifying, checking, certifying and/or validating of the quality control information and had stored the results as the compliance information.

While various embodiments have been described hereinabove, it is to be appreciated that various changes in form and detail may be made without departing from the spirit and scope of the invention(s) presently or hereafter claimed. The various embodiments described above can be combined to provide further embodiments. Accordingly, the claims are not limited by the disclosure.

The invention claimed is:

1. A computer-implemented method comprising:
causing, at a time when a manufacturing machine is in an initial locked state, a quality control query to be presented to a user of the manufacturing machine requesting quality control information regarding the manufacturing machine including inspection information regarding the manufacturing machine, wherein the quality control information includes information regarding one or more dates of certification of the manufacturing machine;
in response to the quality control query being presented to the user of the manufacturing machine, receiving, via input from the user of the manufacturing machine, the quality control information regarding the manufacturing machine including inspection information regarding the manufacturing machine, wherein the receiving quality control information regarding the manufacturing machine includes receiving the quality control information at a device located at a premises different from a premises at which the manufacturing machine is located;
deciding, at a time when the manufacturing machine is in an initial locked state, whether to enable operation of the manufacturing machine based on the received quality control information including inspection information regarding the manufacturing machine wherein the manufacturing machine is in the initial locked state before, and continues to be in the initial locked state during, the receiving of the quality control information including inspection information regarding the manufacturing machine and the deciding whether to enable operation of the manufacturing machine and wherein the deciding whether to enable operation of the manufacturing machine based on the received quality control information including inspection information regarding the manufacturing machine includes:
comparing the received quality control information including inspection information regarding the manufacturing machine to a quality standard;
determining whether the received quality control information including inspection information regarding the manufacturing machine meets the quality standard;
deciding not to enable operation of the manufacturing machine when the received quality control information including inspection information regarding the manufacturing machine does not meet the quality standard; and
deciding to enable operation of the manufacturing machine when the received quality control information including inspection information regarding the manufacturing machine does meet the quality standard; and
when it is determined to enable operation of the manufacturing machine based on the received quality control information including inspection information regarding the manufacturing machine then, while the manufacturing machine is still in the initial locked state:
generating a signal to enable operation of the manufacturing machine; and
transmitting the generated signal from the device to the manufacturing machine to enable operation of the manufacturing machine.

2. The method of claim 1 wherein the quality control information includes maintenance information regarding the manufacturing machine.

3. The method of claim 1 further comprising first disabling operation of the manufacturing machine.

4. The method of claim 1 further comprising, when it is decided to not enable operation of the manufacturing machine based on the received quality control information, then generating a message indicating the operation of the manufacturing machine has not been enabled.

5. The method of claim 4 wherein the message indicating operation of the manufacturing machine has not been enabled includes information related to quality control information regarding why the operation the manufacturing machine has not been enabled.

6. The method of claim 1 further comprising:
sending a request from the manufacturing machine to a server to receive information indicative of the quality standard; and
in response to the request, receiving at the manufacturing machine the information indicative of the quality standard.

7. The method of claim 1 further comprising:
prompting a user for credential information;
verifying user credential information; and
prompting the user to provide the quality control information based on the verified user credential information.

8. The method of claim 7 further comprising:
prompting the user to provide identification information of the manufacturing machine, and wherein the deciding whether to enable operation of the manufacturing machine based on the received quality control information includes:
sending a request to a server to receive information indicative of a quality standard specific to the manufacturing machine based on the provided identification information of the manufacturing machine; and
in response to the request, receiving the information indicative of the quality standard specific to the manufacturing machine.

9. A manufacturing machine comprising:
at least one processor;
at least one mechanical manufacturing element communicatively coupled to the at least one processor; and
a memory coupled to the at least one processor, wherein the at least one processor is configured to:
receive quality control information regarding the manufacturing machine from a device located at a premises different from a premises at which the manufacturing machine is located, wherein the quality control information includes information regarding one or more dates of certification of the manufacturing machine;
receive information indicative of a quality standard specific to the manufacturing machine;
compare the quality control information to the quality standard specific to the manufacturing machine;
determine, at a time when the manufacturing machine is in an initial locked state, whether the quality control information meets the quality standard specific to the manufacturing machine, wherein the manufacturing machine is in the initial locked state before, and continues to be in the initial locked state during, the receiving of the quality control information, the receiving information indicative of a quality standard, the comparing the quality control information to the quality standard and the determining whether the quality control information meets the quality standard; and while the manufacturing machine is still in the initial locked state, enable operation of the manufacturing machine when the quality control information meets the quality standard specific to the manufacturing machine, including by receiving a generated signal from the device at the manufacturing machine to enable operation of the manufacturing machine.

10. The manufacturing machine of claim 9 wherein the at least one processor is further configured to disable operation of the manufacturing machine if the quality control information does not meet the quality standard specific to the manufacturing machine.

11. The manufacturing machine of claim 9 wherein the quality control information includes information regarding operator qualifications of the manufacturing machine.

12. The manufacturing machine of claim 9 wherein the quality control information includes information regarding manufacturing machine training on the manufacturing machine.

13. The manufacturing machine of claim 9 wherein the quality control information includes information regarding health and safety requirements of the manufacturing machine.

14. A non-transitory computer-readable storage medium having computer executable instructions thereon, that when executed by a computer processor, cause the following method to be performed:

receiving quality control information regarding a plurality of manufacturing machines, wherein the quality control information includes information regarding one or more dates of certification of the manufacturing machine;

receiving information indicative of quality standards specific to each of the plurality of manufacturing machines;

receiving a request from a manufacturing machine of the plurality of manufacturing machines for quality control information regarding the manufacturing machine;

in response to receiving the request for quality control information regarding the manufacturing machine, providing the requested quality control information regarding the manufacturing machine to the manufacturing machine;

receiving a request from the manufacturing machine for information indicative of a quality standard specific to the manufacturing machine at a time when the manufacturing machine is in an initial locked state; and in response to receiving the request for information indicative of the quality standard specific to the manufacturing machine, providing the requested information indicative of the quality standard specific to the manufacturing machine, wherein the manufacturing machine is in the initial locked state before, and continues to be in the initial locked state during, the receiving of the quality control information, the receiving information indicative of quality standards, the receiving the request from the manufacturing machine for quality control information, the providing the requested quality control information, the receiving the request from the manufacturing machine for information indicative of the quality standard specific to the manufacturing machine and the providing the requested information indicative of the quality standard.

15. The non-transitory computer-readable storage medium of claim 14 wherein the method further comprises:

comparing the quality control information to the quality standards specific to the plurality manufacturing machines;

determining whether the quality control information meets the quality standards specific to the plurality manufacturing machines to produce compliance information, wherein the manufacturing machine is in the initial locked state before, and continues to be in the initial locked state during, the comparing the quality control information to the quality standards and the determining whether the quality control information meets the quality standards.

16. The non-transitory computer-readable storage medium of claim 15 wherein the method further comprises:

receiving a request for the compliance information; and in response to receiving the request for the compliance information, providing the compliance information.

17. The non-transitory computer-readable storage medium of claim 16 wherein the request for the compliance information is from another manufacturing machine of the plurality of manufacturing machines.

18. The non-transitory computer-readable storage medium of claim 17 wherein the request for the providing the compliance information includes providing the compliance information to the other manufacturing machine to enable the other manufacturing machine to decide whether to enable operation of the other manufacturing machine based on the compliance information, wherein the other manufacturing machine is in an initial locked state before, and continues to be in the initial locked state during, the deciding whether to enable operation of the other manufacturing machine.

* * * * *